United States Patent [19]

Leibholz

[11] Patent Number: 4,903,021
[45] Date of Patent: Feb. 20, 1990

[54] SIGNAL ENCODING/DECODING EMPLOYING QUASI-RANDOM SAMPLING

[76] Inventor: Stephen W. Leibholz, 1204 Pheasant Rd., Rydal, Pa. 19046

[21] Appl. No.: 267,662

[22] Filed: Nov. 3, 1988

Related U.S. Application Data

[63] Continuation of Ser. No. 129,886, Nov. 24, 1987, abandoned, which is a continuation of Ser. No. 864,154, May 16, 1986, abandoned, which is a continuation of Ser. No. 444,179, Nov. 24, 1982, abandoned.

[51] Int. Cl.⁴ ............................................. H03M 1/00
[52] U.S. Cl. .................................. 341/110; 341/123; 364/179; 364/919
[58] Field of Search ............... 341/110, 123, 126, 127, 341/144, 155, 158; 364/919, 934, 934.2, 934.3, 939.4, 178, 179; 358/138; 381/31; 328/151; 360/32

[56] References Cited

U.S. PATENT DOCUMENTS

| | | |
|---|---|---|
| 3,383,461 | 5/1968 | Mallig . |
| 3,662,380 | 5/1972 | Cargile .................... 340/347 AD |
| 3,934,094 | 1/1976 | Kobayashi et al. ............. 455/323 X |
| 3,988,529 | 10/1976 | Ellis . |
| 4,068,265 | 1/1978 | Russell ........................... 358/133 |
| 4,112,425 | 9/1978 | Zobrist et al. ................ 340/347 AD |
| 4,136,396 | 1/1979 | Hansford ............................ 364/554 |
| 4,142,146 | 2/1979 | Schumann et al. ................ 324/77 A |
| 4,308,585 | 12/1981 | Jordan ................................. 341/110 |
| 4,393,371 | 7/1983 | Morgan-Smith ......... 340/347 SH X |
| 4,626,827 | 12/1986 | Kitamura et al. ..................... 341/110 |
| 4,673,916 | 6/1987 | Kitamura et al. ............. 340/347 SH |

OTHER PUBLICATIONS

Kawade et al., A Variable Sampling Rate Coding Technique, Electronics and Communications in Japan, vol. 58-A, No. 2, 2/1975, pp. 11-20.
The Engineering Staff of Analog Devices, Inc., Analog-Digital Conversion Handbook, 6/1972, pp. I-84 to I-87, & (I-41 to I-47).
Fjallbrant, Method of Data Reduction of Sampled Speech Signals, Electronics Letters, 5/1977, vol. 13, No. 11, pp. 334-335.

Primary Examiner—William M. Shoop, Jr.
Assistant Examiner—Brian K. Young
Attorney, Agent, or Firm—Dilworth, Paxson, Kalish & Kauffman

[57] ABSTRACT

A signal transmission system and method is provided in which analog signals are sampled quasi-randomly and the samples stored. The samples are thereafter retrieved with an equal interval between them and transmitted. At the receiver, the transmitted samples are stored, decoded and reconstituted with the original quasi-random sample interval therebetween. The transmission system and method permits the faithful capture and transmission of signals across bandwidth limited transmission systems even though such signals lie outside that bandwidth.

2 Claims, 6 Drawing Sheets

_Fig. 2A_

_Fig. 2B_

PRIOR ART

SIGNAL ENCODING/DECODING EMPLOYING QUASI-RANDOM SAMPLING

This is a continuation of application Ser. No. 129,886, filed Nov. 24, 1987, which in turn is a continuation of Ser. No. 864,154, filed May 16, 1986, which in turn is a continuation of Ser. No. 444,179, filed Nov. 24, 1982, all now abandoned.

BACKGROUND OF THE INVENTION

The present invention relates in general to a system and to a method for encoding and decoding a signal and also to a method for transmitting signals from one location to another. In particular, it relates to a system and to a method for encoding and decoding a signal which increases the acceptable bandwidth of many systems without increasing the sampling rate thereof and without the effect of aliasing.

There are a large number of applications in which a fundamentally analog and generally repetitive signal must be quantized or sampled in temporal terms, for example, for subsequent recording, transmission and/or processing. This sampling in the time domain is often, but not necessarily, associated with digitization of the signal according to some algorithm. The need for sampling analog signals may arise, for example, in the areas of mensuration, communications, signal analysis, and synthesis.

The prior art has generally employed techniques in which sampling was accomplished at a constant rate: The prior art has also determined the maximum time between samples to accurately capture the information content of signals in a given bandwidth by resort to a theorem developed by Nyquist. The Nyquist theorem states, in effect, that the full informational content of a signal within a given bandwidth $\Delta F$ can be captured only if $$T \leq \frac{1}{2\Delta F}$$

where T is the intersample period. Therefore, for any given bandwidth, the time between samples must be less than a given maximum value and accordingly the sampling rate must be greater than a given minimum value for the full informational content of the sampled signal to be captured. Once the sampling rate of any system has been determined according to the Nyquist theorem for a particular bandwidth, if a signal having a frequency outside the bandwidth is presented to the system, the phenomenon of aliasing occurs. Aliasing is a phenomenon in which the signal is reflected in the frequency domain about the upper corner frequency ($\frac{1}{2}T$) or its harmonics.

It would be desirable to provide a signal encoding and decoding system and method which minimizes the effect of aliasing when signals having a frequency outside a selected bandwidth are presented to the system. One possible means of achieving this objective would be merely to increase the sampling rate of the system, thereby increasing the bandwidth thereof. However, the maximum sampling rate of a system is typically determined by hardware limitations on digitizer settling rates (cross-talk) or alternatively digital communication or data transfer bit-rate limitations. Accordingly, one cannot increase the sampling rate in any given system without limit so as to increase the bandwidth.

It would be desirable to provide a signal encoding and decoding technique which would permit the sampling of signals having frequencies greater than the bandwidth of systems operating at their maximum sampling rate.

SUMMARY OF THE INVENTION

This objective is achieved in the present invention by a signal encoding/decoding system which includes a first quasi-random interval generator and a means responsive to the quasi-random interval generator for producing coded samples of a signal, the time between the samples varying quasi-randomly. A second quasi-random interval generator is also provided which is synchronized with the first and a means responsive to the second quasi-random interval generator is provided for decoding the coded samples. By quasi-random interval generator is meant a device which produces pulses at times which appear to be statistically random but which are actually predetermined.

In its broadest terms, the method of encoding a signal according to the present invention includes the step of sampling the signal at a rate varying quasi-randomly and the method of decoding further includes the step of thereafter reconstituting the signal from samples at that varying rate. The use of the foregoing coding techniques permits the enhancement of any system of which sampling is an integral part by the dispersion of otherwise aliased energy into increased system noise. Accordingly, signals having spectral elements above the Nyquist limited frequency may be accepted for sampling, or conversely, the mean sampling rate of the system may be set below twice the maximum spectral contribution of interest.

BRIEF DESCRIPTION OF THE DRAWINGS

The present invention will be more fully understood by reference to the accompanying drawings in which.

DETAILED DESCRIPTION OF THE PREFERRED EMBODIMENT

Figure 1:
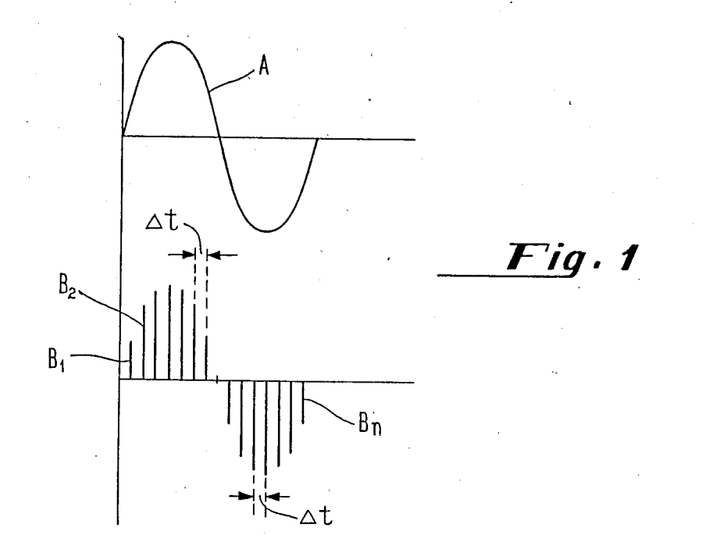
FIG. 1 is a waveform diagram of a signal to be encoded as well as the codes produced therefrom.

Referring now to FIG. 1, a time varying signal A to be encoded may be seen. In accordance with both the prior art and also in accordance with the present invention, signals such as A are encoded by taking amplitude samples $B_1, B_2 \ldots B_n$ thereof as shown. In accordance with classical sampling techniques, the time interval $\Delta t$ between each of the samples $B_1, B_2 \ldots B_n$ is a constant, with the maximum interval $\Delta t$ being determined by the Nyquist theorem described above. In accordance with the present invention the time interval $\Delta t$ is not a constant, but a variable. Specifically, in accordance with the present invention $\Delta t$ varies quasi-randomly. Put another way, the present invention employs a signal encoding technique wherein the sampling rate varies quasi-randomly. By quasi-random rate is meant a rate which appears to vary in a statistically random manner but which is actually a product of a fixed generation method.

Figure 2:
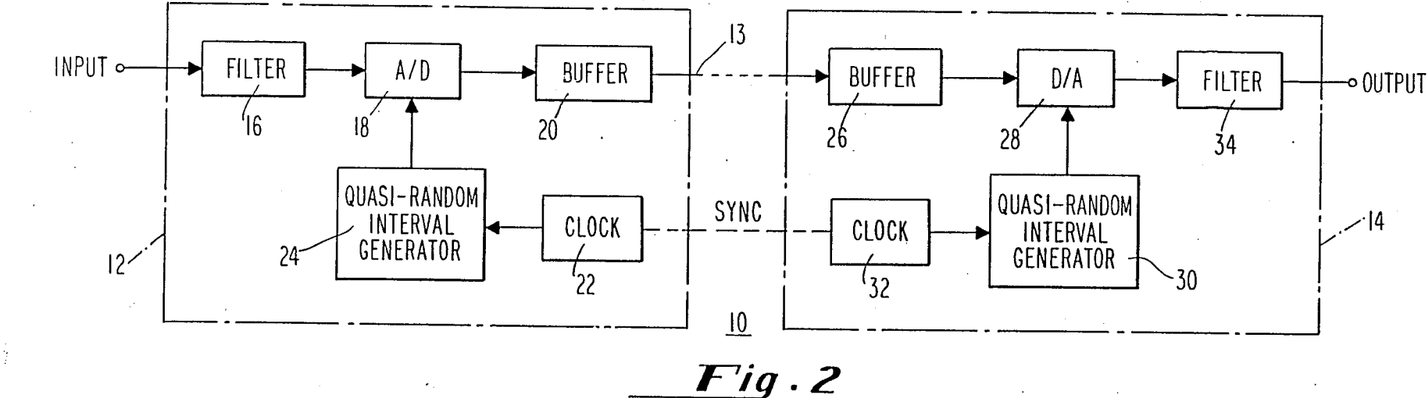
FIG. 2 is a simplified block diagram of a signal transmission system employing the present invention.

Referring now to FIG. 2, a transmission system 10 which employs the encoding/decoding technique of the present invention may be seen. The transmission system 10 includes a sampling and digitizing subsystem 12 at a first location and a signal reconstitution subsystem 14 at a second location. The digitizing and reconstitution subsystems 12 and 14 are interconnected by means of a transmission line 13. The sampling and digitizing subsystem 12 includes a band pass filter 16 to which an input signal to be encoded and transmitted is applied. The output of the band pass filter 16 is directed to a means for producing coded samples of the signal, the means including in one embodiment an analog-to-digital converter 18. The analog-to-digital converter 18 produces coded samples of the input signal. These coded samples are directed to a first buffer 20. In accordance with the present invention, a first quasi-random interval generator 24 is provided which operates under the control of the subsystem clock 22. The analog-to-digital converter 18 is responsive to the first quasi-random interval generator 24 such that the coded samples produced by the analog-to-digital converter 18 have a time therebetween which varies quasi-randomly as will be described below.

The aforementioned signal reconstitution subsystem 14 includes a second buffer 26 to which coded samples which have been retrieved from the first buffer 20 are transmitted with a substantially constant interval therebetween. The signal reconstitution subsystem 14 further includes a means for decoding the coded samples stored in the second buffer 26. This decoding means is preferably a digital-to-analog converter 28. The digital-to-analog converter 28 is responsive to a second quasi-random interval generator 30. The second quasi-random interval generator 30 operates under the control of the subsystem clock 32 which is synchronized to the subsystem clock 22 of the sampling and digitizing subsystem 12. Since the clocks 22 and 32 are synchronized, the first and second quasi-random interval generators 24 and 30 are also synchronized. The output of the digital-to-analog converter 28 is directed to a second tuneable filter 34 which produces the system output.

The operation of the transmission system of FIG. 2 as well as the encoding and decoding scheme employed therein will now be described. Input signals are applied to the tuneable bandpass filter 16. The bandpass filter 16 determines the bandwidth of signals to be encoded. In accordance with the present invention, the bandwidth admitted by filter 16 may be wider than the acceptable bandwidth of transmission line 13. Input signals in the accepted bandwidth are sampled by the analog-to-digital converter 18 at a rate which is determined by the quasi-random interval generator 24. Accordingly, the time between the samples produced by the analog-to-digital converter 18 varies quasi-randomly. These coded samples are directed to the first buffer 20 where they are stored and thereafter retrieved with the time interval between samples being constant. The time interval between retrieved samples from the buffer 20 is chosen to be within the acceptable bandwidth of the transmission line 13. The retrieved signals from the first buffer 20 are thereafter transmitted to the second buffer 26 where they are stored and subsequently retrieved. The retrieved coded samples are then decoded by a digital-to-analog converter 28 operating under the control of the second quasi-random interval generator 30 to produce the original reconstituted signal.

Figure 2A:
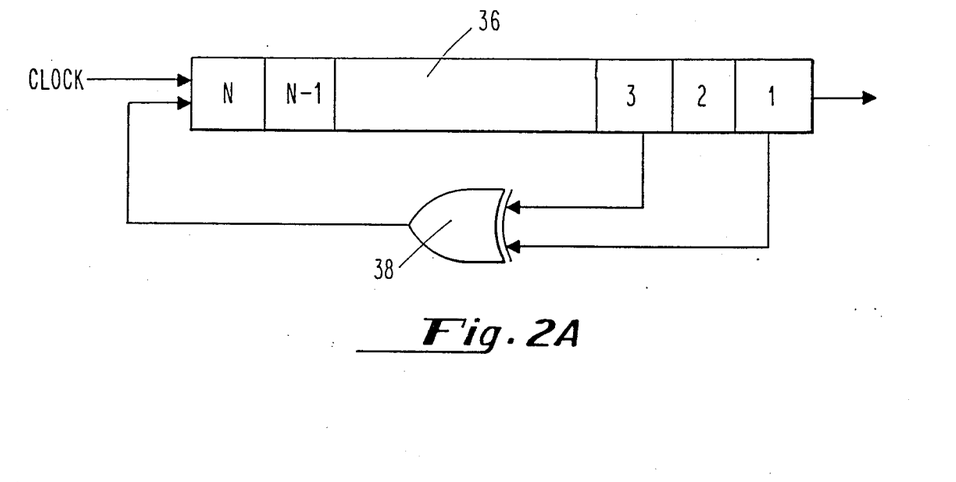
FIG. 2A is a detailed diagram of one form of a quasi-random number generator of a type useful in connection with the block diagram of FIG. 2.

One example of an appropriate quasi-random number generator which may be used as part of the quasi-random interval generator 24 and which may also be utilized in the quasi-random interval generator 30 may be seen in FIG. 2A. The quasi-random number generator shown in FIG. 2A comprises an N-bit serial shift register 36 operating under the control of the system clock 22. Selected bits of the shift register 36 are directed to an exclusive OR gate 38. The output of the gate 38 is recirculated to the input of the register 36. For each new quasi-random binary number stored in the shift register 36, two bits are shifted back to the register thereby creating a new N-bit quasi-random number.

If the quasi-random interval generator 30 is of the same type as the quasi-random interval generator 24, if clocks 22 and 32 are synchronized and if both the shift registers 36 of both quasi-random interval generators are initialized with the same N-bit number, the outputs of the quasi-random interval generators 24 and 30 will vary randomly but in step with one another.

Figure 2B:
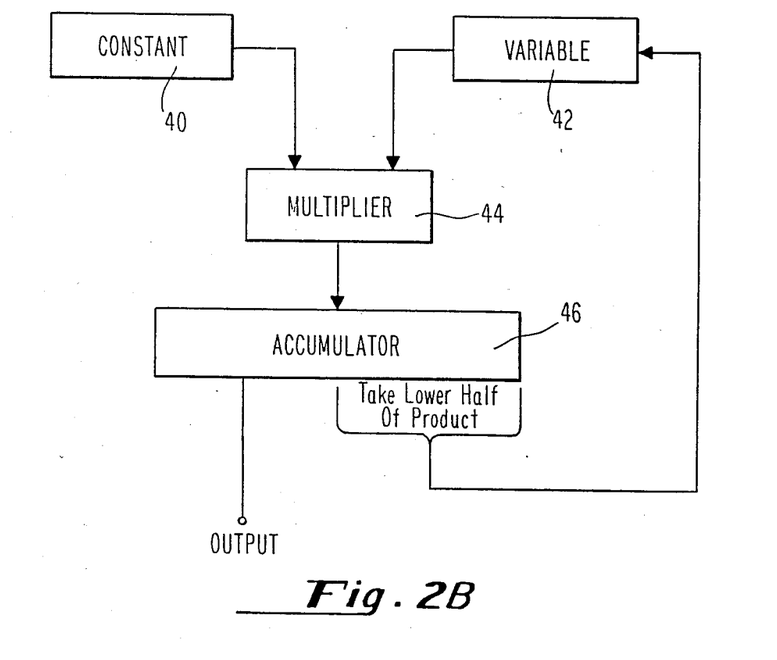
FIG. 2B is a detailed circuit diagram of another form of quasi-random number generator.

Referring now to FIG. 2B another embodiment of quasi-random number generator will be seen. The quasi-random number generator of FIG. 2B includes a register 40 for storing a constant and a register 42 for storing a variable. The contents of registers 40 and 42 are directed to a multiplier 44. The output of multiplier 44 is the product of the constant stored in register 40 and the variable stored in register 42. This output is directed to the accumulator 46. The lower half of the product stored in the accumulator 46 is recirculated to the variable register 42. Accordingly, the output from accumulator 46 is a binary number which varies quasi-randomly.

Figure 3A:
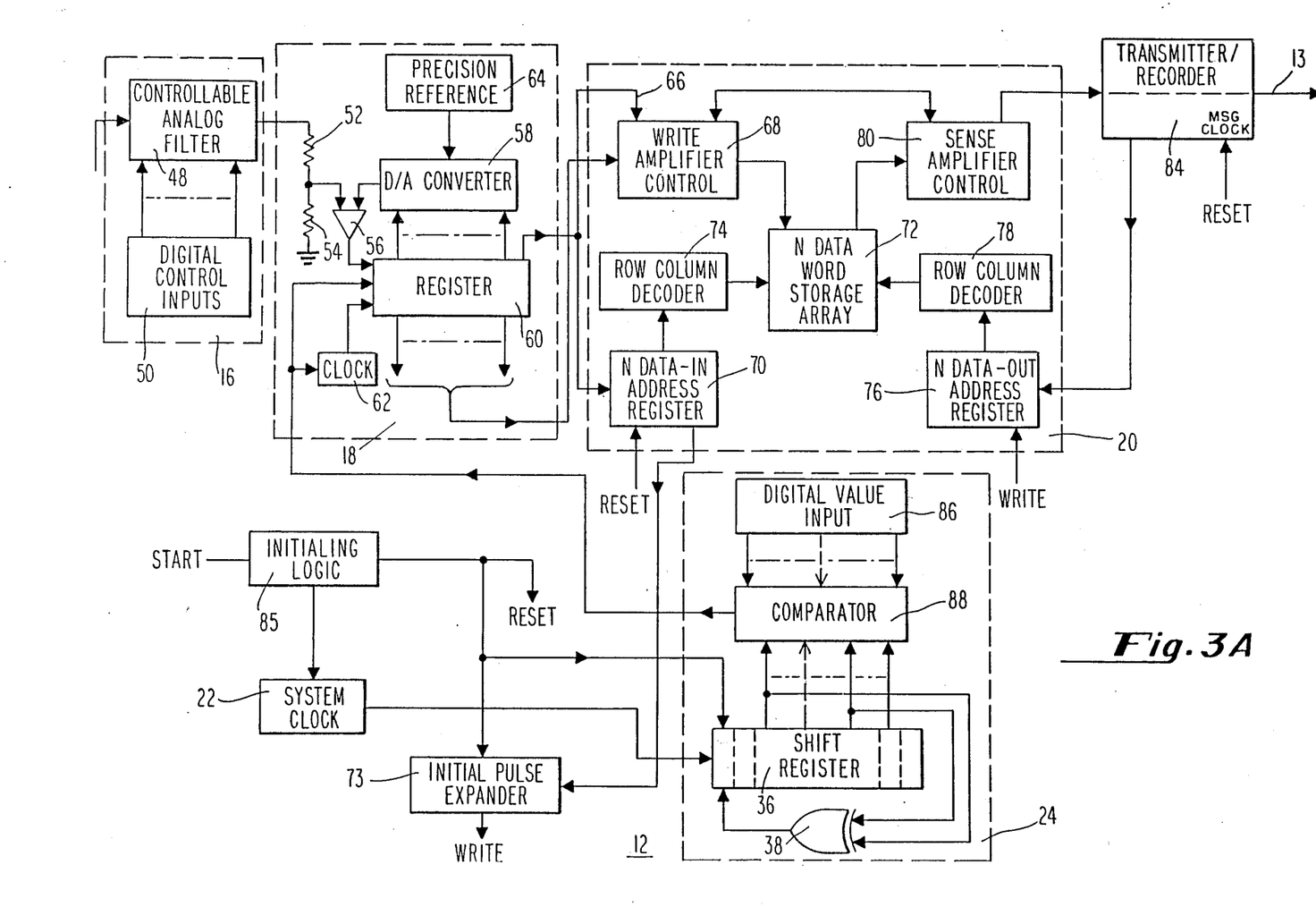
FIG. 3A is a detailed schematic of the sampling and digitizing subsystem of the transmission system shown in FIG. 2.

Referring now to FIG. 3A, the digitizing subsystem 12 of the transmission system 10 will be described in detail. As will be seen, the input signal to be transmitted is directed to the bandpass filter 16. The bandpass filter 16 includes a controllable analog filter 48, the bandwidth of which is controlled by digital inputs 50 as shown. Varying the digital inputs 50 to the controllable analog filter 48 controls the bandwidth of analog signals directed to the analog-to-digital converter circuit 18. The analog-to-digital converter circuit 18 includes a voltage divider comprising resistors 52 and 54, the output voltage of which is directed to a comparator 56. Also directed to the comparator 56 is the output of a digital-to-analog converter 58. The digital-to-analog converter 58 is responsive to the precision reference 64 as shown. The digital input of the digital-to-analog converter 58 is the binary word stored in a register 60 operating under the control of a clock 62. If a start pulse is received from the quasi-random interval generator 24 and if the inputs to comparator 56 are unequal, the binary word in the register 60 is incremented by the clock 62 until such time as the voltage inputs to the comparator 62 are equal. At this time, an end-of-count signal 66 is directed to the write amplifier control section 68 and to the N data-in address register of the buffer 20. At this time, the binary word stored in the register 60 (which represents the digital value of one sample of the voltage amplitude of the input signal) is transferred in parallel by the write amplifier control 68 to the N data-word storage array 72. This digital word is stored at the location determined, by the row column decoder 74.

In accordance with the preferred embodiment, samples are stored in the N-data word storage array 72 until such time as the array is, for example, half full. When the array 72 is half full, a signal is directed from the N data-in address register 70 to the initial pulse expander 73 which in turn produces a write signal. The write signal is directed to the N data-out address register 76 of the buffer 20 which controls the row column decoder 78. When the next end-of-count signal 66 is directed to the write amplifier control 68, the sense amplifier control 80 is activated and the oldest samples stored in the N-data word storage array 72 are directed to a transmitter/recorder 84. Samples are retrieved from buffer 20 by pulse expander 73 with a substantially constant interval therebetween.

The quasi-random interval generator 24 includes a shift register 36 and an OR gate 38 and is responsive to the subsystem clock 22 as described in connection with FIG. 2A above. The quasi-random interval generator 24 further includes the digital value input 86 and a digital comparator 88. The output of the comparator 88 is a square wave, the period of which varies randomly as determined by whether the value stored in the shift register 36 is greater than or less than the value stored in the digital value input 86. Since the binary numbers stored in the shift register 36 is an N-bit quasi-random number, the period of the square wave output of the comparator 88 is a quasi-random time interval. The output from the comparator 88 is utilized for synchronizing the clock 62 and for resetting the value stored in the register 60.

The subsystem 12 shown in FIG. 2A further includes initializing logic 85 for resetting the subsystem clock 22, the N data-in address register 70, the initial pulse expander 73 and the shift register 36 when a start signal is received.

Figure 3B:
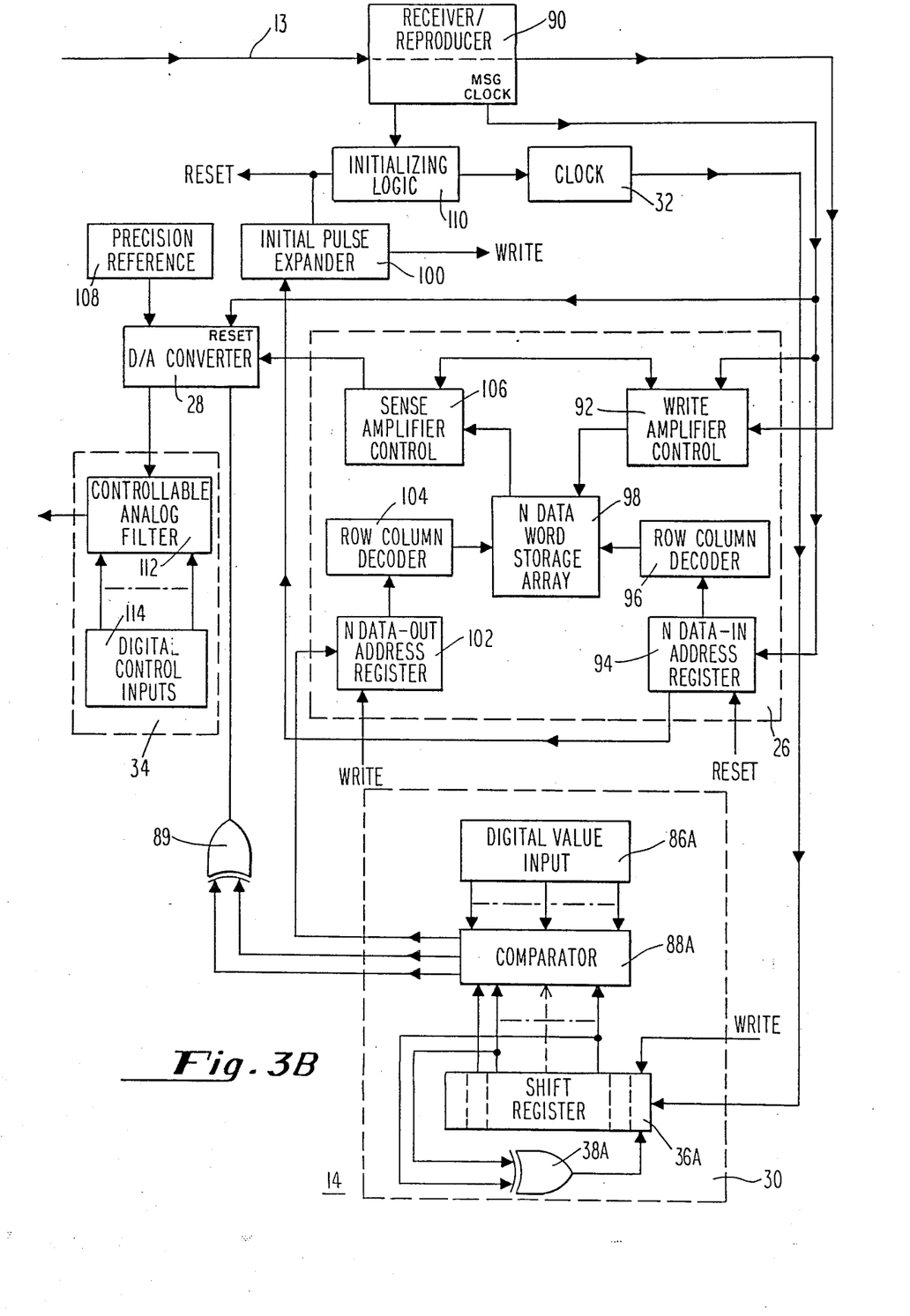
FIG. 3B is a detailed circuit diagram of the signal reconstitution subsystem of the transmission system of FIG. 2.

Referring now to FIG. 3B, the signal reconstitution subsystem 14 will be described in detail. Digital samples from the transmitter/recorder 84 are directed to a receiver/reproducer 90 as shown. When a sufficient number of samples to constitute a word had been received, message clock signals from the receiver/reproducer 90 are directed to the write amplifier control section 92 of the buffer 26 and also to the N data-in address register 94. The N data-in address register 94 advances the row column decoder 96 so as to properly locate the received samples in the N data word storage array 98. The N data-in address register 94 further controls the input pulse expander circuit 100 such that when the N data word storage array 98 is, for example, half full, a write signal is produced. The write signal is used to control the N data-out address register 102 which, in turn, controls a row column decoder 104 such that upon receipt of the next incoming word, sense amplifier control 106 outputs the oldest word stored in the N data word storage array 98 to the digital-to-analog converter 28. The digital-to-analog converter 28 is responsive to a precision reference 108 and is also responsive to the second quasi-random interval generator 30.

The second quasi-random interval generator 30, like the first quasi-random interval generator 24, includes a shift register 36A and an OR gate 38A as shown. The shift register 36A operates under the control of subsystem clock 32 as described above. Also, like the first quasi-random interval generator 24, the second quasi-random interval generator 30 includes a digital value input 86A and a digital comparator 88A as shown.

In a preferred embodiment, the output of the comparator 88A is directed to the N data-out register 102. If the quasi-random number in shift register 36A is less than the number stored in digital input value 86A, (as determined by logic not shown) the coded samples stored in the N data word storage array 98 are unloaded. If the quasi-random number stored in shift register 36A is greater than the number stored in digital value input 86A or equal to that number as determined by OR gate 89, the digital-to-analog converter 28 is inhibited.

The signal reconstitution subsystem 14 in FIG. 3B also includes initializing logic 110 which is utilized for resetting the system clock 32 and also to the N data-in address register 94.

Figure 4A:
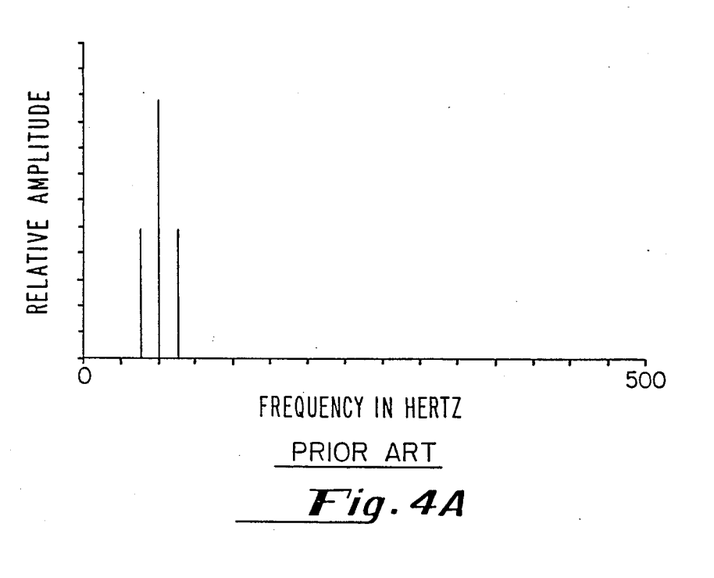
FIGS. 4A and 4B are plots of the frequency spectrum of signal samples taken in accordance with prior art techniques and in accordance with the present invention respectively at rates above the Nyquist rate.
Figure 4B:
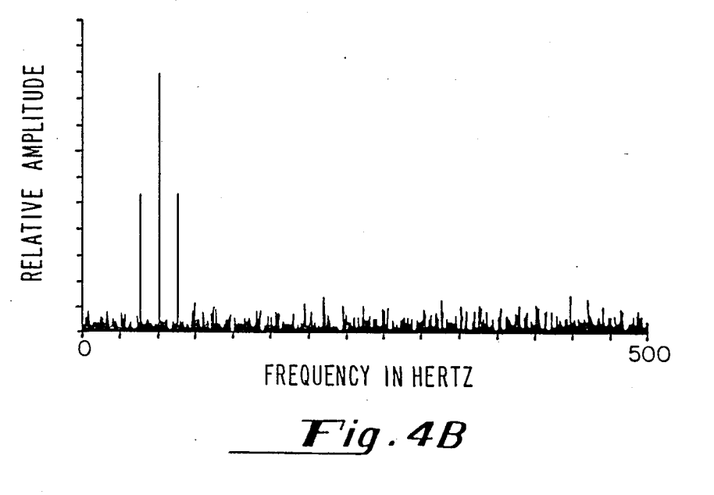

Referring now to FIGS. 4A and 4B, as well as 5A and 5B, the advantages of the present invention will be seen. FIG. 4A depicts an amplitude vs. frequency plot of samples obtained when, for example, a 64 hz sine wave signal is sampled according to the prior art techniques wherein the time interval, $\Delta t$, between samples is equal. This may be compared to a plot in FIG. 4B wherein the time interval between samples varies quasi-randomly in accordance with the present invention. In both FIGS. 4A and 4B, the sampling rate is above the aforementioned minimum Nyquist rate. It will be seen that the informational content of the signal is captured in both instances, however, only at the expense of increased noise when the present invention is utilized. However, as may be seen from FIGS. 4A and 4B, the signal-to-noise ratio decreases only a minor amount.

Figure 5A:
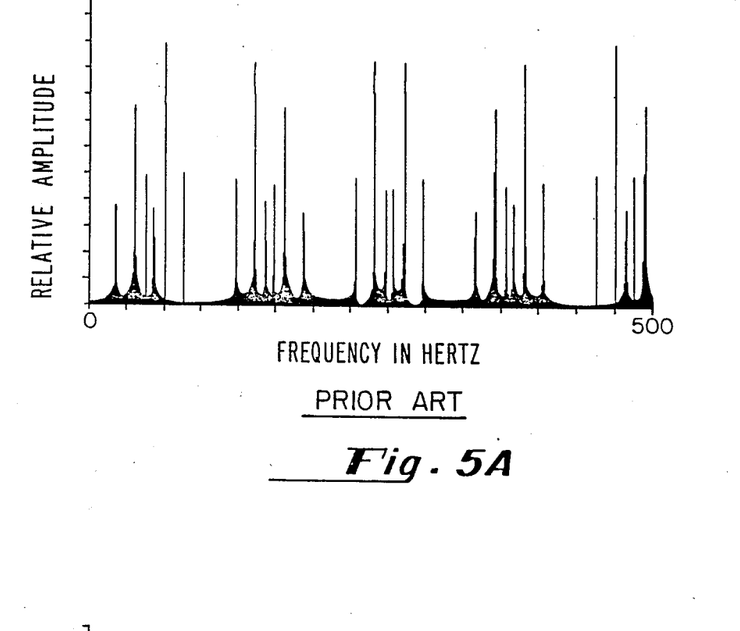
FIGS. 5A and 5B are plots of the frequency spectrum of the same signals sampled and coded in accordance with the prior art techniques and in accordance with the present invention respectively at rates below the Nyquist rate.
Figure 5B:
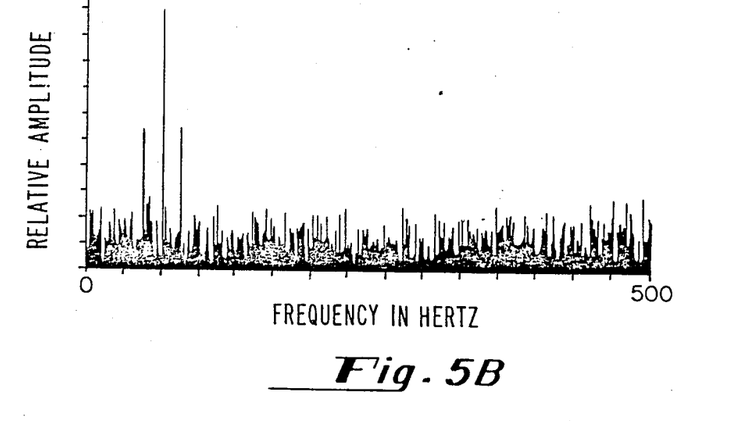

Referring now to FIG. 5A, sampling according to the prior art of the aforementioned 64 hz sine wave signal at a rate below the Nyquist limit will be seen. As may be appreciated, sampling below the Nyquist rate results in the aforementioned problem of aliasing such that the informational content of the signal is lost due to the presence of harmonics. However, referring to FIG. 5B wherein the quasi-random sampling technique of the present invention is employed, the informational content of the signal may be seen, however, again, at the expense of a decrease in the signal-to-noise ratio.

While the present invention has been described in connection with a signal transmission system, those skilled in the art will readily appreciate that the present encoding and decoding technique may also advantageously be utilized in the recording and subsequent reconstruction of signals without transmission from one location to another. It is also useful in the direct analysis of signals with or without recording or transmission. In addition, other modifications and variations of the present invention are possible in light of the above teachings. It is therefore to be understood that within the scope of the appended claims, the invention may be practiced otherwise than as specifically described.

What is claimed is:

1. A signal transmission system having a maximum transmission frequency for transmitting said signal, the signal having a minimum sampling frequency which exceeds said maximum transmission frequency, said system including an encoding subsystem and decoding subsystem comprising:

a first quasi-random interval generator including means for generating a substantially random number;

means responsive to said first quasi-random interval generator for producing coded samples of said signal, the time between said samples varying quasi-randomly;

a first buffer for storing said coded samples;

a clock means for retrieving said coded samples from said first buffer, the time between each of said retrieved coded samples being substantially equal, and the frequency of said retrieved coded samples being substantially equal to said maximum transmission frequency;

a second buffer remote from said first buffer for storing said retrieved coded samples;

a second quasi-random interval generator including means for generating a substantially random number, said second quasi-random interval generator being synchronized with said first quasi-random interval generator; and means responsive to said second quasi-random interval generator for decoding the retrieved coded samples from said second buffer.

2. A method of transmitting a signal from a first to a second location across a transmitting medium having an upper frequency limit, said signal having a minimum sampling requency which exceeds said upper frequency limit, comprising:

sampling said signal at said first location at a rate varying quasi-randomly, said rate being determined by a means for generating a substantially random number, to produce coded samples thereof;

storing said coded samples in a buffer at said first location;

retrieving said coded samples, stored in said buffer at said first location, at a constant rate;

transmitting said retrieved coded samples to said second location across said transmitting medium, said retrieved coded samples having a frequency substantially equal to said upper frequency limit;

receiving said transmitted coded samples in a buffer at said second location;

retrieving said coded samples from said second buffer at a constant rate; and reconstituting said signal from said coded samples, retrieved from said second buffer, at said quasi-randomly varying rate.

* * * * *